Figure 1:
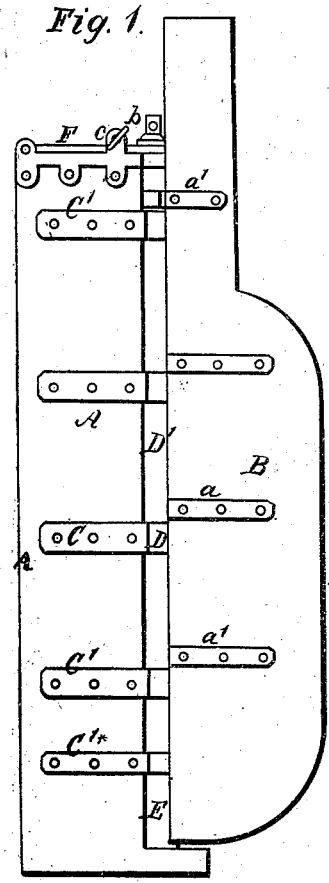

Sheet 1. 3 Sheets

C. N. Nixon.
Steering.

Nº 15,704.   Patented Sep. 9, 1856.

Sheet 2, 3 Sheets

C. N. Nixon.
Steering.

N° 15,704. Patented Sep. 9, 1856.

N. PETERS, PHOTO-LITHOGRAPHER, WASHINGTON, D.C.

Sheet-3. 3 Sheets
C. N. Nixon.
Steering.
Nº 15,704. Patented Sep. 9, 1856.
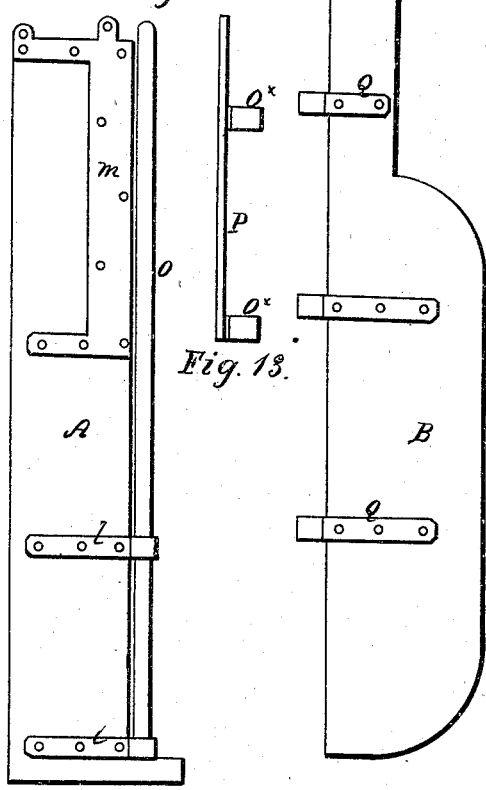
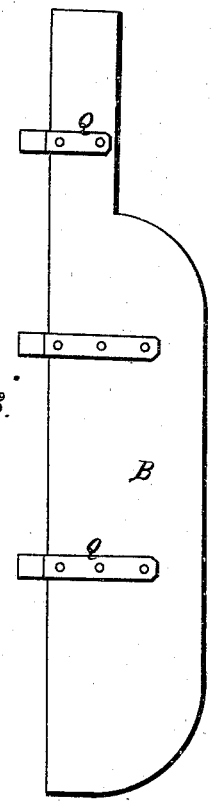
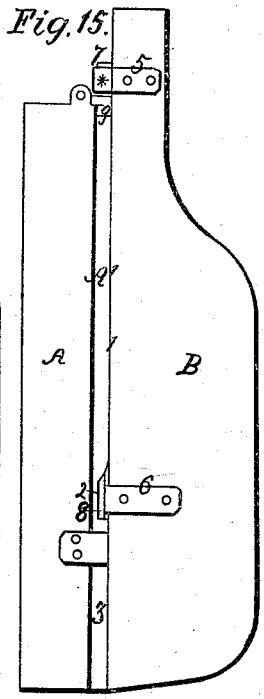
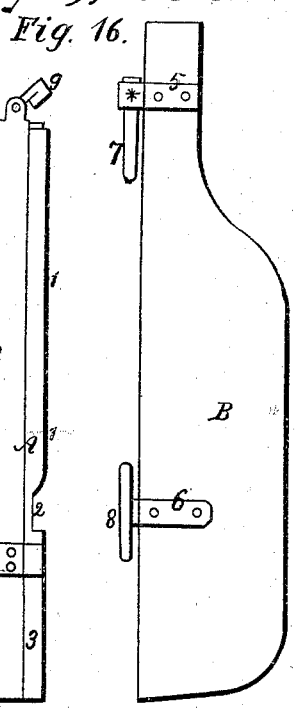
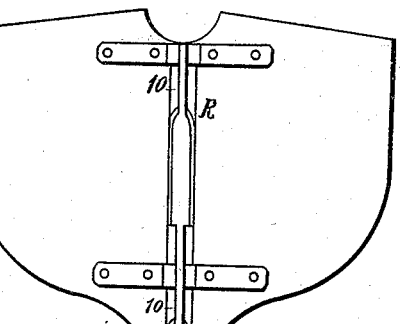
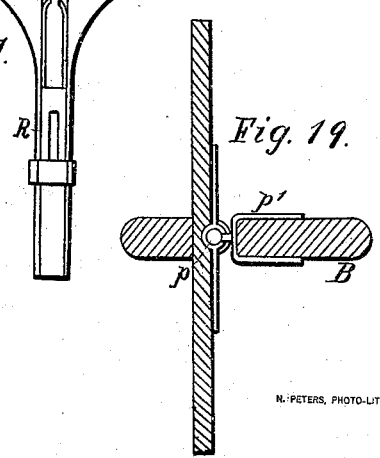
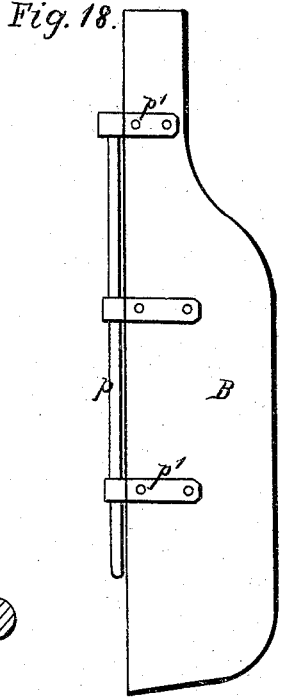
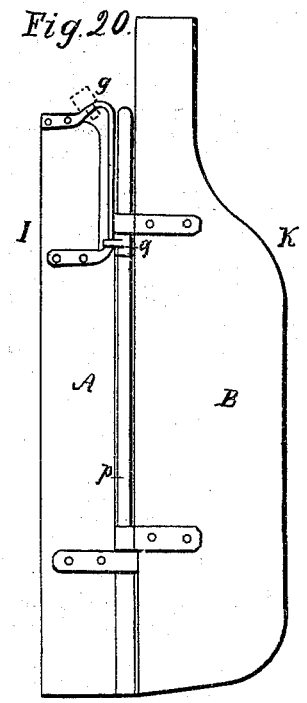

UNITED STATES PATENT OFFICE.

CHRISTOPHER N. NIXON, OF RAMSGATE, ENGLAND.

HANGING SHIPS' RUDDERS.

Specification of Letters Patent No. 15,704, dated September 9, 1856.

*To all whom it may concern:*

Be it known that I, CHRISTOPHER NUGENT NIXON, of Ramsgate, in the county of Kent, England, gentleman, a subject of the Queen of Great Britain, have invented or discovered a new and useful Improved Mode of Attaching Rudders to Floating Vessels; and I, the said CHRISTOPHER NUGENT NIXON, do hereby declare the nature of the said invention and in what manner the same is to be performed to be particularly described in and by the following statement thereof, that is to say:

My invention consists of certain modes of attaching rudders to floating vessels and is designed for the purpose of enabling such said rudders to be more readily shipped and unshipped when necessary and also to admit of their rising when coming in contact with any obstacle upon which they may accidentally strike and thereby be lost or rendered ineffective.

The nature of my invention will however be more readily understood by the following description thereof and the modes of applying the same to ships and boats.

Firstly as regards ships in or upon the face of the stern post where the rudder is usually connected by a hinge or hinges I either form or affix a groove or socket with a narrow mouth or opening in front thereof. This groove or socket may either be formed entire from the top to the bottom or it may be divided into two or more sections or parts. Into the aforesaid groove or socket I fit a bar or rod of metal of similar form thereto which bar when attached to the said groove or socket forms a hinge for the rudder to turn upon and to slide up and down and thus admits of the rudder being readily shipped and unshipped when necessary. Or instead of having a groove in the face of the stern post as above mentioned I attach to the hinge of the rudder an elongated spanner or clip which is capable of sliding up and down the stern post either in grooves or upon flanges fixed to or formed thereon and I form the said spanner or clip in one or more sections or parts as in the case of the sockets before mentioned.

Secondly as regards smaller vessels. Instead of hinging the rudder to a sliding bar or to a sliding groove or to spanners as before stated, I attach a bar rod or pin to the rudder by means of grooves and tongues feathers or clips which are arranged and disposed at or near the top the bottom and the middle of the said bar rod or pin leaving intermediate openings or spaces between such said grooves or tongues feathers or clips and the back of the rudder to enable the sides and edges of the grooves which are on the stern post of the vessel to pass freely around the aforesaid bar rod or pin when the rudder is in action and moving from right to left or vice versa. And I further attach to or form upon the stern post grooves or sockets similar to those before mentioned with reference to ships but with intermediate openings or spaces between the said grooves or sockets for the tongues or clips of the bar which is attached to the rudder to pass freely around the same when the rudder is in action as before stated taking care to leave sufficient space between the tongues or clips of the said bar and the grooves or sockets to allow the rudder to be partially raised or to be entirely raised when it is required to be unshipped. If desirable the bar rod or pin above mentioned may be made fast to the stern post and the grooves or sockets be attached to the rudder in either case the bottom of the said bar rod or pin can be let into a spur or projecting piece fixed to or formed upon the bottom of the keel of the vessel. I would however remark that I do not intend to limit or confine myself to this mode of attaching rudders to stern posts of small vessels only as the same may be employed with advantage in ships or large vessels.

Thirdly as regards boats I proceed in a similar manner to that lastly stated observing that by the above mode of letting the bar or hinge pin into a spur of the keel of the boat and securing the said pin at the top by a sliding bar ring or other similar and suitable contrivance and by an eye and straps fixed near the bottom thereof and by attaching hinge sockets to the rudder I obtain similar facilities to those above mentioned for raising and lowering the rudder. But in order to explain my said invention as completely as possible I now proceed to describe the best means I am acquainted with for carrying the same into practical effect reference being had to the illustrative drawing hereto annexed and forming part of this my specification and to the numeral figures and letters of reference marked thereon respectively as follows.

Figure 2:
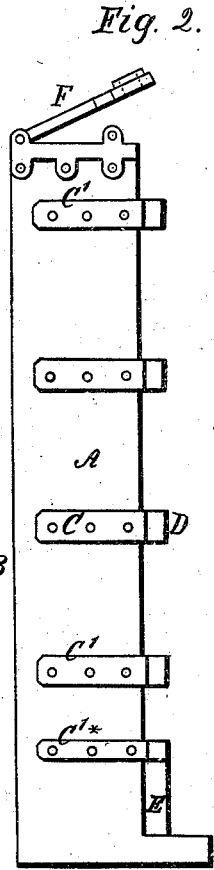
Figure 5:
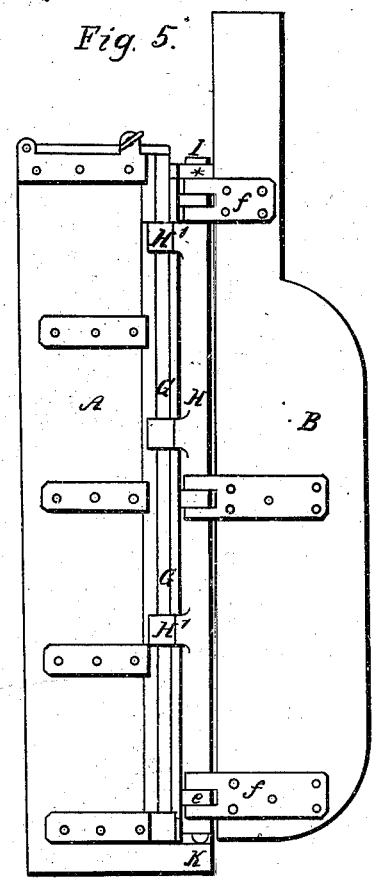
Figure 4:
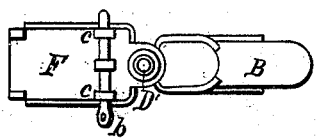
Figures 3, 6:
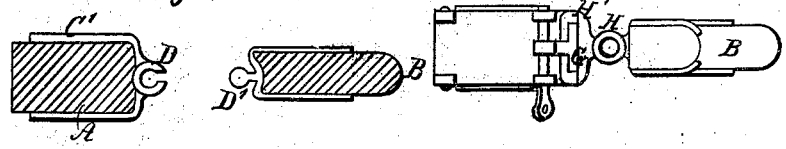
Figure 7:
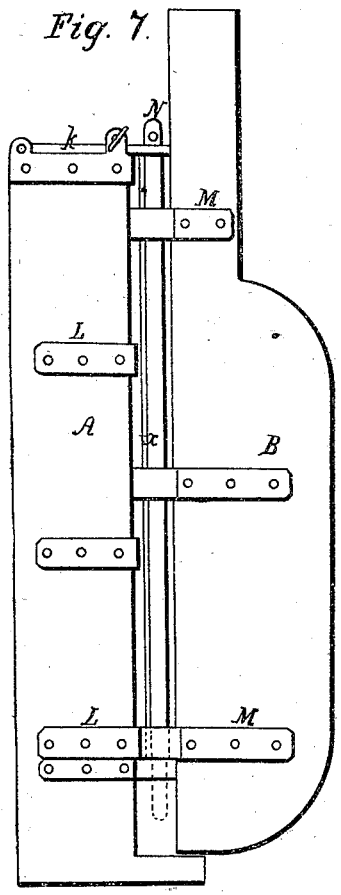
Figure 8:
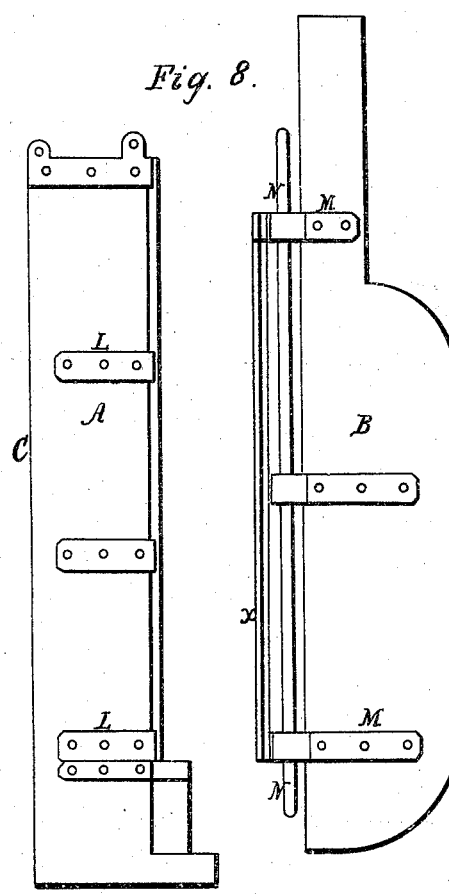
Figure 11:
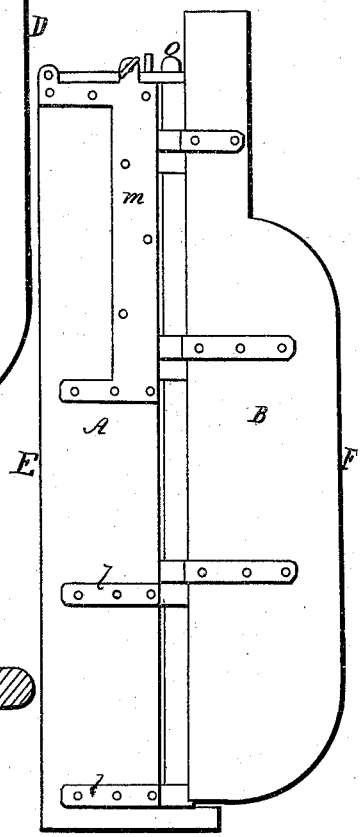
Figure 10:
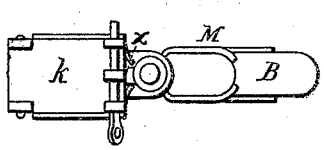
Figure 9:
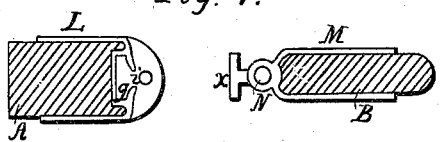
Figure 14:
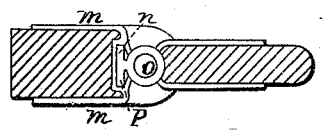

*Description and drawing.*—Figure 1 is a side view complete of a rudder and stern post constructed according to my said invention applicable to floating vessels. Fig. 2 is a side view of the said rudder and stern post detached from each other. Fig. 3 is a horizontal section through the line A B (at Fig. 1) of the said stern post and rudder. Fig. 4 is a top plan view thereof. Fig. 5 represents a side view of another mode of constructing and attaching the rudder and stern post. Fig. 6 is a top plan view thereof. Fig. 7 is a side view of another mode of constructing and attaching the rudder and stern post. Fig. 8 is a side view of the said rudder and stern post detached from each other. Fig. 9 is a horizontal section thereof through the line CD at Fig. 8 of the above stern post and rudder. Fig. 10 is a top plan view thereof. Figs. 11, 12, 13, 14 exhibit four views of another mode of constructing and attaching a rudder and stern post. Fig. 11 is a side view complete of the said rudder and stern post. Fig. 12 is a side view of the rudder and stern post detached from each other. Fig. 13 exhibits the removable bearing hereinafter described detached from the rudder and stern post. Fig. 14 is a horizontal section through the line E F (at Fig. 11) of the above rudder and stern post. Figs. 15 to 21 inclusive exhibit several views of other modes of attaching rudders and stern posts applicable to boats. Fig. 15 is a side view complete of one of the said rudders and stern posts. Fig. 16 is a side view of the same detached. Fig. 17 is an end elevation of the stern of a boat constructed according to my invention the rudder being detached therefrom as at Fig. 18 which is a side view of said rudder. Fig. 19 is a horizontal section of the above rudder and stem as they would appear when connected together. Fig. 20 is a side view complete of a rudder and stern post constructed upon the same principle as that exhibited at Figs. 7 and 8. Fig. 21 is a horizontal section through the line IK (at Fig. 20).

At each of the foregoing figures I employ similar letters of reference to denote corresponding parts in so far as such parts appear or can be seen at each of the said figures respectively.

At Figs. 1, 2, 3, 4 A is the stern post, B the rudder.

C are straps of metal with eyes D formed therein. These straps are fixed to the stern post by bolts or pins as shown; the three upper straps have slits formed therein to allow the straps on the rudder to pass freely through the same.

D′ is a rod of metal to which are securely fixed in any convenient manner straps $a$; these straps are fixed to the rudder by bolts or pins passed through the same. The extreme upper and lower straps $a'$ are formed with shoulders or collars which rest respectively upon the extreme upper and lower straps $c'$ which are upon the stern post. The lower part of the stern post has a spur or projecting piece E fixed to or formed thereon and the lower strap $c^{1*}$ has a recess formed therein to receive the lower end of the rod or hinge pin D which rests and turns therein when connected thereto and the rudder is in action.

E is a plate or cap hinged to the upper end of the stern post and serves to retain the hinge pin D in proper position when the rudder is in use, a screwed pin or bolt $b$ being passed through lugs $c$ which holds the plate or cap E close down to the stern post and yet allows the rudder to rise upon the bottom thereof being accidentally struck.

The difference of construction between the rudder and stern post lastly above described and that exhibited at Figs. 5 and 6 is as follows: At Figs. 2 and 3 the stern post A has a T-shaped piece of metal G fixed thereto in any convenient manner which extends nearly the whole length of the stern post; the part $d$ of the piece of metal G is embraced by straps $n$ fixed to or formed upon another piece of metal H which is somewhat shorter than the piece G to allow the rudder to rise partially when in use as before stated. The upper and lower parts of the piece H are formed with projections $e$ which fit and take into corresponding openings in metal straps $f$ which are securely fixed by bolts or pins to the rudder at suitable distances as under the part H¹ of the piece H has a hole formed through the same which receives a hinge pin 1, which passing through holes in the straps $f$ forms a hinge and thus connects the rudder and the stern post together; the bottom of the pin I rests in a spur or projecting piece K and thus supports the rudder and allows it to turn freely when in use, so that in the event of the bottom of the rudder being accidentally struck or coming in contact with any obstruction the rudder will rise partially by the sliding of the strap $n$ upon the piece H.

The construction of the rudder and stern post exhibited at Figs. 7, 8, 9, 10 is as follows: The face of the stern post A has a metal groove $i$ inserted therein and the sides and a portion of the stern post have plates of metal L securely fixed thereto as shown, so as to leave a long slit or opening $g$ of nearly the length of the stern post. B is the rudder to which is fixed by bolts or pins three or more straps of metal M; these straps have holes formed therein into and through which the hinge pin passes; this pin is formed with a T-shaped projection extending between the upper and lower straps M and the lower end of the hinge pin N takes into a hole in a metal plate fixed upon the spur of the stern post as exhibited; thus it will be seen that by inserting the T-shaped projection of the hinge pin N into the groove $i$ the rudder may be readily connected to the stern post which is secured thereto by a hinged plate or cap $k$ in which there is a hole which passes over the top of the hinge pin N and finally a pin or screw is passed through the said pin which keeps the plate or cap $k$ close down upon the top of the stern post sufficient space being left between the upper strap M on the rudder and the plate or cap $k$ to allow the rudder to rise and fall as before stated. I would here remark that instead of forming a groove in the stern post and attaching a T-shaped hinge pin to the rudder the hinge pin may be made with a clip piece of the same length as the T-shaped piece and a T-shaped piece be fixed to the stern post in a somewhat similar manner and upon the same principle as the arrangement before described with reference to Figs. 3 and 4, and as regards the construction of the rudder and stern post exhibited at Figs. 11 12 13 and 14 it is as follows: To the stern post A a hinge pin O is securely connected by straps of metal $l$ fixed thereto the upper part of the stern post has plates of metal $m$ fixed to the sides thereof the said plates being bent so as to embrace a portion of the front of the stern and thus form a slit or opening opposite to a groove $n$ in the upper part of the stern post into this groove a piece of metal P (shown detached at Fig. 13) takes and fits the same being formed with eyes $o$ which pass over the upper part of the hinge pin and thus form rests for the upper straps on the rudder and serve to strengthen the pin when the rudder B is connected thereto by the straps Q which are fixed thereto the upper end of the stern post is also furnished with a plate or cap and pin or screw for keeping the rudder in its proper position and allowing it to rise partially when necessary as before stated.

The construction of the rudder and stern post exhibited at Figs. 15 and 16 is as follows: To the stern post A of a boat I affix by screws or other convenient means a tube of metal A′ with slits and openings 1 and 2 therein the bottom of said tube resting upon or in a spur or projection 3 fixed to or formed upon the stern post B is the rudder to which I fix straps of metal 5 and 6 which have short hinge pins 7 and 8 fixed to or formed thereon or it may be one long hinge pin these pins fit and slide and turn in the said tube and the shoulder of the upper pin the top of the stern post as shown the lower 7 rests upon the cap 9 which is hinged to pin together with the rudder being free to move from right to left by cutting a piece out of the tube as at 2. And as regards the arrangement exhibited at Figs. 17 18 19 it is as follows: To the stern of the boat I securely fix a piece of metal R of the shape exhibited at Fig. 17 and I securely fix by straps $p'$ and screws or pins a hinge pin $p$ (shown at Fig. 18) which fits into the piece R the straps $p'$ passing through the slits 10 in the piece R and I hollow out the wood of the rudder to allow it to clear the piece R when the rudder is in action. And lastly as regards the arrangement exhibited at Figs. 20 and 21 it is simply a modification of the arrangement before described and represented at Figs. 7, 8, 9, 10, the principal difference consisting in substituting a sliding eye $q$ in lieu of the removable piece of metal P at Fig. 13. It is therefore only necessary to lift up the sliding piece $q$ into the position denoted by the dotted lines to disconnect the rudder from the stern post.

What I claim as my invention and desire to secure by Letters Patent, is—

1. The use or construction as applied to sailing vessels for steering purposes of the groove or socket as described in my specification, whether the same be formed to extend from the top or near the top to or near to the bottom of the stern post, whether the same be continuous or divided into sections or parts.

2. I claim the rod, continuous or in sections, attached to the rudder and combined with the groove or other equivalent attached to the stern post.

CHRISTR. N. NIXON.

Witnesses:
 WM. EWING,
 JOHN R. DARKER.